(12) United States Patent
Truelove et al.

(10) Patent No.: US 7,979,790 B2
(45) Date of Patent: Jul. 12, 2011

(54) COMBINING AND DISPLAYING MULTIMEDIA CONTENT

(75) Inventors: Benjamin Nicholas Truelove, Lynnwood, WA (US); Chunkit Chan, Redmond, WA (US); Jae Pum Park, Sammamish, WA (US); Shabbir Abbas Shahpurwala, Sammamish, WA (US); William Mountain Lewis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1218 days.

(21) Appl. No.: 11/363,451

(22) Filed: Feb. 28, 2006

(65) Prior Publication Data

US 2007/0204209 A1     Aug. 30, 2007

(51) Int. Cl.
*G06F 17/30* (2006.01)
(52) U.S. Cl. ....................................................... 715/234
(58) Field of Classification Search ................... 715/203, 715/234
See application file for complete search history.

(56) References Cited

U.S. PATENT DOCUMENTS

| 5,659,793 | A | * | 8/1997 | Escobar et al. | 715/202 |
| 6,061,696 | A | * | 5/2000 | Lee et al. | 715/209 |
| 6,384,865 | B1 | * | 5/2002 | Numata | 348/448 |
| 7,119,849 | B2 | * | 10/2006 | Yui et al. | 348/564 |
| 2004/0201610 | A1 | * | 10/2004 | Rosen et al. | 345/731 |
| 2005/0027539 | A1 | * | 2/2005 | Weber et al. | 704/275 |
| 2005/0193015 | A1 | * | 9/2005 | Logston et al. | 707/104.1 |
| 2005/0259144 | A1 | * | 11/2005 | Eshkoli | 348/14.07 |
| 2005/0289466 | A1 | * | 12/2005 | Chen | 715/731 |
| 2006/0050085 | A1 | * | 3/2006 | Bossut et al. | 345/629 |
| 2007/0031112 | A1 | * | 2/2007 | Ricci | 386/95 |

* cited by examiner

*Primary Examiner* — Laurie Ries
*Assistant Examiner* — Tionna Smith
(74) *Attorney, Agent, or Firm* — Shook, Hardy & Bacon L.L.P.

(57) ABSTRACT

A method and system to manage rendering of multimedia content are provided. A theme specifies a collection of layouts defining multimedia content placement. The multimedia content is processed to extract one or more characteristics. The layouts are selected and populated with multimedia content based on the one or more characteristics associated with the multimedia content. The multimedia content is rendered by transitioning through the selected layouts.

16 Claims, 7 Drawing Sheets

```
<PhodeoLayoutPage Time=Default Value>
  <Phodeo type="Landscape/Portrait" >
    <TopLeft X="0.3586" Y="0.4705" Z="0" />
    <TopRight X="0.4803" Y="0.4812" Z="0" />
    <BottomLeft X="0.3506" Y="0.5619" Z="0" />
    <BottomRight X="0.4723" Y="0.5726" Z="0" />
  </Phodeo>
</PhodeoLayoutPage>
<Camera>
  <Position X="0.5687" Y="0.3948" Z=".2" />
  <Target X="0.5687" Y="0.3948" Z=".08" />
  <Orientation X=".1392" Y="-.9903" Z="0" />
</Camera>
```

FIG. 2

COMBINING AND DISPLAYING MULTIMEDIA CONTENT

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Conventionally, images and videos are rendered utilizing separate applications. The image applications may render images in a slide show, which transitions between images. Independently, the video applications may play and edit the videos. The separate applications are utilized because of different rendering formats associated with images and videos and limited processing power associated with client devices.

For instance, the conventional image application may generate a slide show by transitioning through a collection of images. The transitions are fade-in and fade-out effects that enable the image application to render each image in the collection of images. The conventional image application cannot render videos because formats for videos differ from formats for images. The conventional video application renders the videos by utilizing a player that is able to decode the video and display each frame of the video at a specified rate. In a conventional system, displaying images and videos concurrently requires a user to open an instance of the conventional image application and an instance of the conventional video application, to render the images and videos, respectively.

SUMMARY

Embodiments of the invention relate to a system and method that manages multimedia content rendering. The multimedia content is received and processed to determine one or more characteristics. A theme including one or more layouts is selected, and the layouts are populated with the multimedia content based on the characteristics of the multimedia content. In turn, the multimedia content is rendered by camera movements associated with the theme.

In another embodiment, a synthesizer component communicates with a graphics-processing unit to concurrently render the multimedia content, which includes videos and images. The synthesizer selects one or more layouts and generates buffers for the multimedia content. The graphics-processing unit maps the buffers to the one or more layouts and updates a subset of the buffers with multimedia content at specified intervals. Moreover, the graphics-processing unit utilizes a cadence associated with each layout and a count of the multimedia content to transition between the layouts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a code diagram that illustrates themes having layouts utilized by embodiments of the invention;

DETAILED DESCRIPTION

Multimedia content represents digital images, video and audio singularly or any combination of video, audio and digital images. Embodiments of the invention manage rendering of multimedia content. Characteristics extracted from the multimedia content control the rendering of the multimedia content. A theme having a collection of layouts is selected based on the characteristics and utilized to organize the multimedia content. The theme includes information that describes the rendering of the multimedia content. The layouts define placeholders for the multimedia content, and the placeholders are populated with the multimedia content and displayed as perspectives captured during camera movements. In an embodiment of the invention, the number of placeholders for multimedia content represents a cadence of the layout having the placeholders.

A system that manages rendering of multimedia content may include one or more devices having processors that execute instructions associated with organizing and displaying multimedia content. The system may utilize a synthesizer communicatively connected to a graphics-processing unit (GPU) to execute the rendering instructions. In an embodiment, the synthesizer is a processor that loads the multimedia content, selects a corresponding theme having a collections of layouts based on characteristics of the multimedia content and transfers multimedia content and layouts to the GPU. The GPU receives the multimedia content and layouts and performs mathematically-intensive operations associated with rendering the multimedia content on layouts that define three-dimensional scenes. In an embodiment of the invention, the synthesizer and GPU may be connected through a communication network, where the GPU is a server device, and the synthesizer is a portable client device, such as laptops, personal digital assistants, smart phones, etc.

Figure 1:
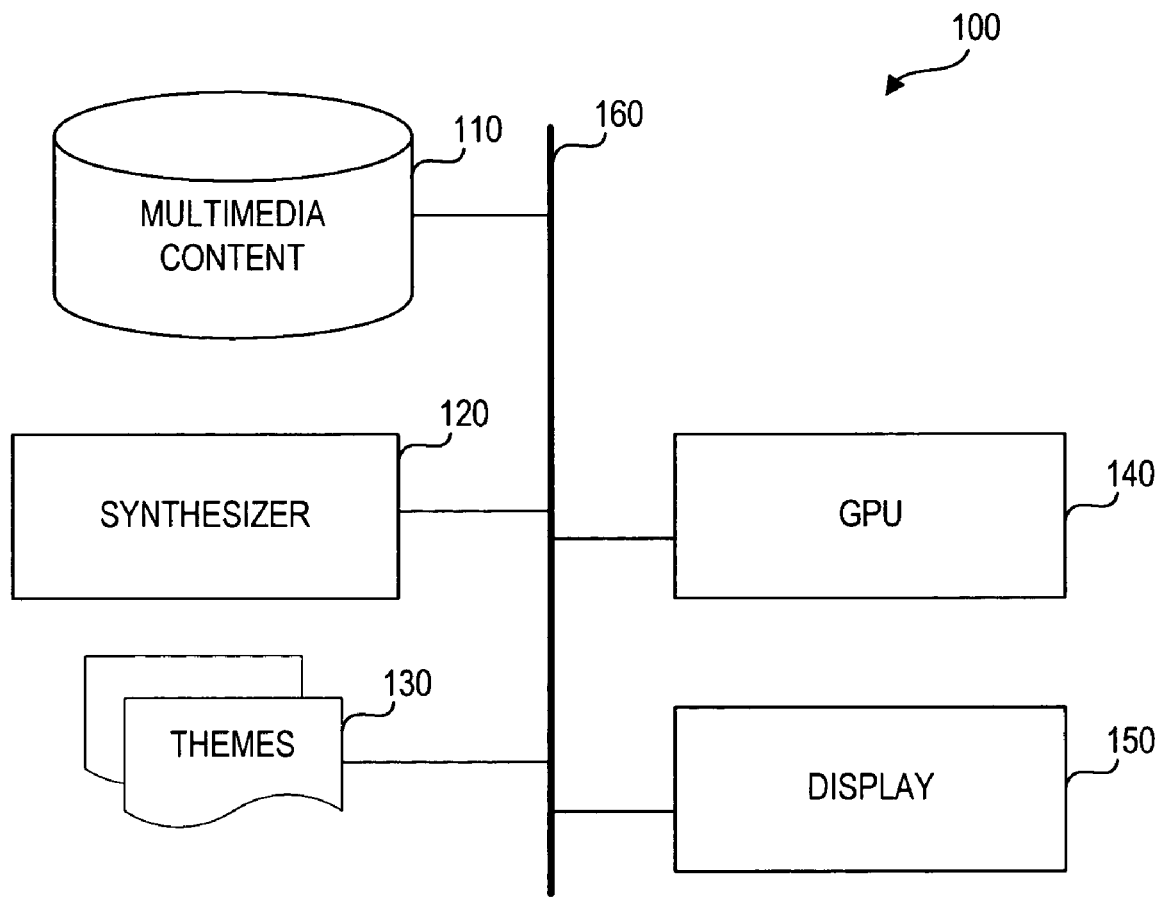
FIG. 1 is a block diagram that illustrates an exemplary computing environment, according to embodiments of the invention.

FIG. 1 is a block diagram that illustrates an exemplary computing environment 100, according to embodiments of the invention. The computing environment 100 is not intended to suggest any limitation as to scope or functionality. Embodiments of the invention are operable with numerous other special purpose computing environments or configurations. With reference to FIG. 1, the computing environment 100 includes a multimedia-content database 110, a synthesizer 120, a collection of themes 130, a graphics-processing unit (GPU) 140 and a display component 150 connected by a communication bus 160.

The synthesizer 120 and GPU 140 are processing units, which may be coupled to a variety of input and output devices and computer-readable media via communication bus 160.

The synthesizer 120 and GPU 140 execute instructions for, but not limited to, loading multimedia content from the multimedia-content database 110, extracting characteristics from the multimedia content, selecting themes from the collection of themes 130, and rendering the multimedia content on the display component 150. Additionally, the synthesizer 120 and GPU 140 utilize the computer-readable media to access instructions associated with rendering of the multimedia content. The computer-readable media may include computer storage and communication media that are removable or non-removable and volatile or non-volatile. By way of example, and not limitation, computer storage media includes electronic storage devices, optical storages devices, magnetic storage devices, or any medium used to store information that can be accessed by the synthesizer 120 and GPU 140, and communication media may include wired and wireless media. The input devices (not shown) may include, mice, keyboards, joysticks, controllers, microphones, cameras, camcorders, or any suitable device for providing user input.

The multimedia-content database 100 stores multimedia content and transfers multimedia content to the synthesizer 120 and GPU 140. In certain embodiments, the synthesizer 120 processes the multimedia content and extracts characteristics, such as aspect ratios, color values, and timing information. The aspect ratios may be utilized to determine whether the multimedia content is portrait or landscape. The GPU processes color value to display the multimedia content. In an embodiment, the color values may be utilized to automatically select colors or a mask for a background associated with the layout to ensure that the multimedia content is properly displayed. The timing information may define the display time for the layout. The characteristics extracted from the multimedia content are utilized to select and configure a theme from the collection of themes 130 for cohesively and attractively rendering the multimedia content, which may include images and videos.

The collection of themes 130 includes themes that define a display area for the multimedia content. The themes may include format information that define border treatment for the multimedia content, layouts for the multimedia content, background information and transition information. The themes also include default values for a speed at which multimedia-content transitions occur. In an embodiment, the synthesizer 120 may automatically select a theme based on the characteristics associated with the multimedia content. The characteristics utilized to select the theme may include, but are not limited to, the length of videos included in the multimedia content or aspect ratios of the multimedia content. In an alternate embodiment, a user may select the theme to format the display area. When a theme is selected by the user, the multimedia content may alter the cadence sequence or other properties associated with the theme.

The synthesizer 120 receives a list of multimedia content from the multimedia-content database 110 and extracts characteristics from the multimedia content included in the list of multimedia content. In turn, the synthesizer 120 utilizes the characteristics to select an appropriate theme for rendering multimedia content. The theme and multimedia content are communicated to the GPU 140 for further processing. The synthesizer 120 generates buffers to stores the multimedia content for processing. In certain embodiments, the synthesizer 120 extracts different characteristics from the multimedia content based on the type of the multimedia content. For instance, characteristics extracted from images may differ from characteristics extracted from videos. The synthesizer 120 may extract duration information from videos, while color information is extracted from images. Thus, the synthesizer 120 may process multimedia content differently based on the type of the multimedia content.

Additionally, the synthesizer 120 places the videos included in the list of multimedia content in different time slots based on the duration of the videos. The time slots are utilized to prevent multiple videos from being rendered simultaneously. The synthesizer 120 receives still images that represent discrete time frames of the videos, such as the first frame. Thereafter at periodic intervals, such as one twenty-fourth of a second subsequent frames are captured and stored in buffers, and the buffers are sent to the GPU 140 for rendering. Accordingly, the synthesizer 120 is able to process the images and videos to select a theme for the multimedia content. In some embodiments, audio is sent to an audio component (not shown) to render the audio. The synthesizer 120 may be implemented in any combination of hardware or software. In an embodiment of the invention, one or more software objects may implement the synthesizer 120. In another embodiment, the synthesizer 120 may be implemented by hardware or firmware.

The GPU 140 receives and further processes the theme and multimedia content to render the multimedia content on the display component 150. The GPU 140 receives the buffers and populates the layouts associated with the theme. The layouts include geometric shapes that define the location and aspect ratio for rendering the multimedia content. Generally, the buffers store color values and texture information for the multimedia content. After the buffers are mapped to the layout, the layout is communicated to the display component 150, which renders the layout having the multimedia content. When a buffer is associated with video content, the synthesizer 120 periodically updates the buffer with multimedia content representing a new frame. Accordingly, the GPU 140 simultaneously renders multimedia content associated with video and images on the display component 150. In an embodiment, the display component includes, but is not limited to, cathode ray tubes (CRT), liquid crystal displays (LCD), or any flat panel display technology device.

The communication bus 160 may be, but is not limited to, Industry Standard Architecture (ISA), Extended Industry Standard Architecture (EISA), or Peripheral Component Interconnect (PCI), etc. Alternatively, the communication bus 160 may be a local area network, a wide area network, satellite network, wireless network or the Internet. The computing environment 100 illustrated in FIG. 1 is exemplary and other configurations are within the scope of the invention.

A computer-implemented method is a method implemented at least in part by a machine or a method implemented at least in part by a computing device. The machine or computing device includes, but are not limited to, a laptop, desktop, personal digital assistant, or multi-processing systems, or any device capable of storing or executing instructions associated with the methods described in the following description.

Embodiments of the invention utilize themes having a collection of layouts for organizing the multimedia content. The themes describe the layouts and other display format information in a markup language, such as Extensible Markup Language (XML). The layouts define placeholders for the multimedia content. The themes also define transitions, which include a cadence and camera movement for displaying the multimedia content. Accordingly, the themes provide the format for a display area displaying the multimedia content.

FIG. 2 is a code diagram that illustrates a theme 200 having layouts utilized by embodiments of the invention. The theme 200 defines a layout 210 and camera position 220 associated with the layout.

The layout 210 defines a collection of placeholders 211 for the multimedia content. The placeholder 211 includes type information that describes the orientation of the placeholder, as either landscape or portrait. An aspect ratio extracted from the multimedia content determines which placeholder 211 is utilized for the multimedia content. In an embodiment, the aspect ratio is the width of the multimedia content divided by the height of the multimedia content. A landscape placeholder 211 is mapped to multimedia content having an aspect ratio less than one, and a portrait placeholder 211 is mapped to multimedia content having an aspect ratio greater than one. In an embodiment, the layout 210 may include one or more placeholder 211 having varying orientations. Additionally, the placeholder 211 also defines a location for storing the multimedia content as a geometric shape in a three-dimensional display space. In certain embodiments, the geometric shape is a rectangle defined by four points 212a-d having x, y, z coordinates. When the multimedia content mapped to the geometric shape is larger or smaller than an area defined by the geometric shape, the multimedia content is scaled to fit the area. In an alternate embodiment, the geometric shape is scaled to fit the multimedia content.

In certain embodiments, the layouts 210 are associated with time information that define how long the layout is displayed on the display component before a transition to a subsequent layout occurs. The time information for the layout may be set to a default value, such as five seconds. In some embodiments, the default value for the time information may be manually altered via user input. In an embodiment, the default value for the time may include slow-approximately five seconds, medium-approximately three seconds or fast-approximately two seconds. When the multimedia content includes a video, the default time for the layout includes the time value associated with the length of the video. When the layout maps multiple videos, the default time for the layout includes the aggregate length of all videos that are mapped to the layout. In certain embodiments of the invention, the duration associated with a layout is not simply the sum of the duration of the videos within the layout. The default time may include the amount of time taken for the multimedia content to appear on screen, as well as any amount of time associated with a photo that is displayed statically. Thus, the default time may include multimedia content load and display times.

The camera position 220 describes the perspectives and movement of the camera from a position 221 to a target 222. The perspective is the camera orientation 223, and the display component utilizes the perspective to render the multimedia content. The camera movement from position 221 to target 222 allows transitions between layouts and provides the cadence for the theme 200. The camera movements define the movement of virtual camera in the three-dimensional space. In certain embodiments, the camera movements are defined by a vector that indicates the direction and angle at which the camera moves when transitioning between layouts. The cadence is a series of numbers representing the placeholders associated with the layouts transitioned through when displaying the multimedia content. For instance, when provided with four pieces of multimedia content, a theme 200 having two layouts 211 is selected. The first layout 210 having one placeholder 211, and the second layout 210 having two placeholders 211. Thus, the cadence for the theme 200 is a one-two cadence. Other cadence examples may include one-one-four, one-two-three, etc. Accordingly, embodiments of the invention provide themes that utilize layouts that define three-dimensional display areas for the multimedia content. The themes provide time information and camera information that a graphics-processing unit uses when rendering the multimedia content on the display component.

The themes provide a collection of layouts that provide a default cadence for rendering the multimedia content. The layout defines the camera movements to enable transitions between layouts. The default cadence associated with the multimedia content may be altered on the fly depending on a count of multimedia content remaining to be displayed. A theme having a predefined collection of layouts may not have a number of placeholders equal to a number of multimedia content in a collection of multimedia content selected for rendering. Accordingly, the default cadence is dynamically altered to properly display the multimedia content selected for rendering.

When rendering the multimedia content, a data structure may be generated and stored in memory to provide a processor with information associated with managing the multimedia content. The data structure may include, but is not limited to, a field to reference the collection of multimedia content, and a field to reference the themes that may be utilized to render the multimedia content. In an embodiment, the themes may include, but are not limited to, layout and cadence information that enables the processor to order and organize the multimedia content. In certain embodiments, the data structure may be implemented with multidimensional data structures, such as, for example, linked lists or queues.

Figure 7:
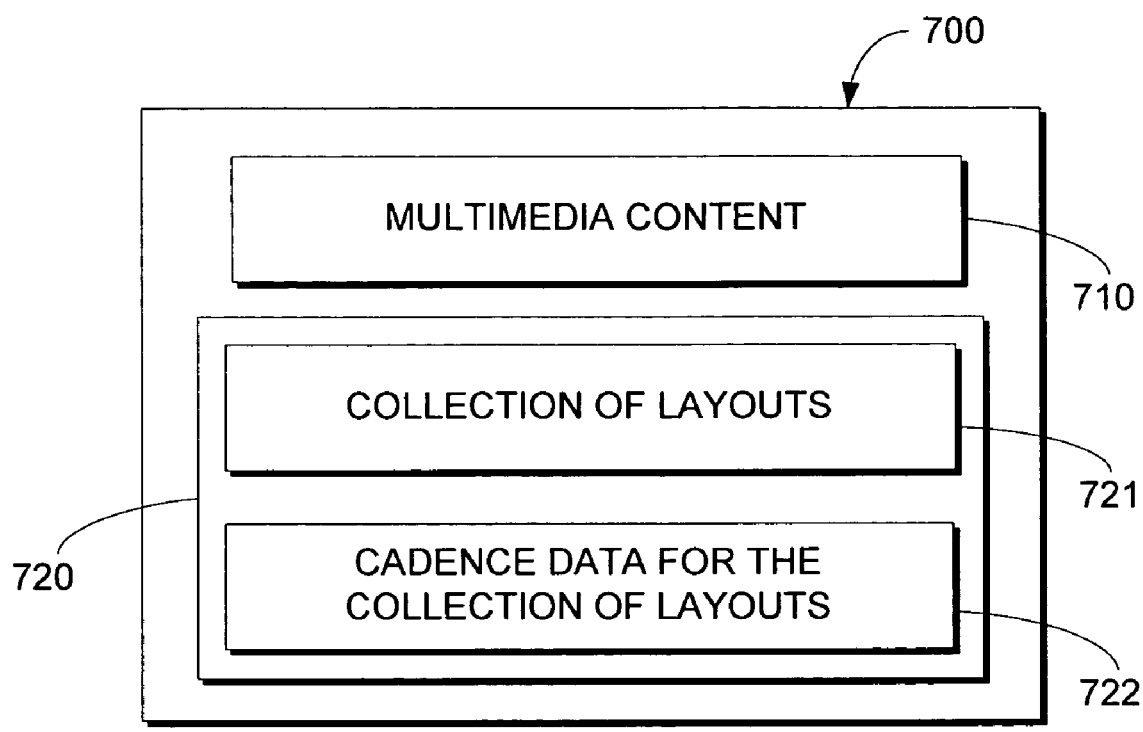
FIG. 7 is a block diagram that illustrates a data structure utilized to display the multimedia content, according to embodiments of the invention.

FIG. 7 is a block diagram that illustrates a data structure 700 utilized to display the multimedia content, according to embodiments of the invention. The data structure 700 includes a media field 710 and a theme field 720. The theme field 720 may include a layout field 721 and a cadence field 722. The media field 710 may store references to a collection of multimedia content. The theme field 720 may store references to one or more themes that are processed to organize and manage the multimedia content. The theme field 720 includes the layout field 721, which references a collection of layouts describing placement of the multimedia content. Also, theme field 720 includes the cadence field, which specifies the sequence of transitions between the layouts. In an embodiment the sequence specifies the order in which each layout is presented. In certain embodiment, the sequence may be altered dynamically based on the characteristics associated with multimedia content.

The camera provides transitions to subsequent layouts included in the sequence, when rendering the layouts having one or more placeholders. In an embodiment, once the layouts are generated and the placeholders are populated with the multimedia content, the transition from the previous to the subsequent layout is initiated. The camera movements associated with the layouts may define the path utilized when transitioning to the subsequent layout. In an embodiment, the previous layout may define the path for the camera movement when transitioning to the subsequent layout. In another embodiment, the subsequent layout may define the path for the camera movement when transitioning to the subsequent layout. In alternate embodiment, the combined camera movement associated with the previous and subsequent layout may provide the path for the camera movement when transitioning to the subsequent layout.

Figure 3:
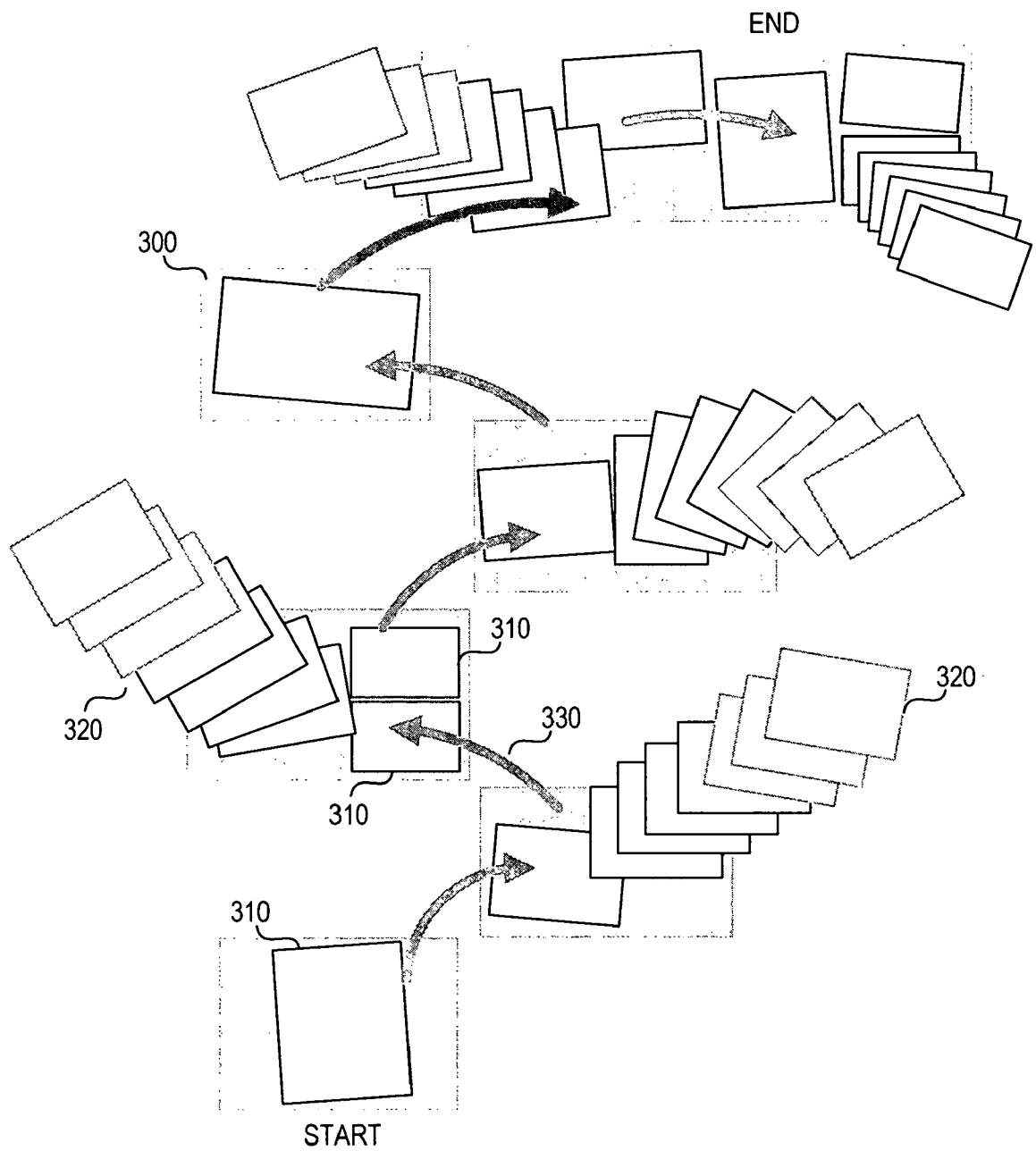
FIG. 3 is a transition diagram that illustrates camera and content movement associated with the layout, according to embodiments of the invention.

FIG. 3 is a transition diagram that illustrates camera and content movement associated with the layouts, according to embodiments of the invention.

The layouts 300 include placeholder 310 or 320 that are mapped to multimedia content. The camera movements 330 traverse from a start layout to and end layout when displaying the collection of multimedia content. The placeholder 310 is mapped to an image and placeholder 320 is mapped to a video. In an embodiment, the placeholders 310 and 320 may move within the layout 300 when a graphics-processing unit focuses on the layout 300. After the placeholders 310 and 320 move, the multimedia content associated with placeholder 310 and 320 are rendered. When rendering video content, the placeholder 320 associated with video content is periodically updated with frames corresponding to the video content. In an embodiment, the camera does not move to a subsequent layout 300 until all processing associated with the placeholders 310 or 320 is complete and the associated default time has transpired. In certain embodiments, the camera begins to move when the video content comes to a point that is close the end of the video content. That is, the camera may start transitioning while the video is playing. Moreover, in some embodiments of the invention, after the multimedia content is rendered, the previous layout 300 is cleared and the subsequent layout 300 having additional multimedia content is drawn on the display.

In an embodiment of the invention, the cadence associated with the theme is dynamically altered depending on a count of the remaining multimedia content. For instance, when the default cadence associated with a theme is a one-one-two cadence having a total of four placeholders, but five pieces of multimedia content is selected for rendering, the cadence for the theme must be altered to display the five pieces of multimedia content. Thus, the last layout having two placeholders is swapped with a new layout having three placeholders, where the new layout is selected based on the count of the remaining multimedia content and the aspect ratios of the multimedia content. Alternatively, a new layout having one placeholder may be included to display the fifth piece of multimedia content. Thus theme cadence is altered to a one-one-two-one cadence.

In an alternate embodiment, the layouts may define background information related to previously rendered multimedia content. The previously rendered multimedia content is masked and utilized as the background of a subsequent layout having one or more placeholders for remaining multimedia content. The previously rendered multimedia content may be an image or a first frame of a video. In certain embodiments of the invention, the mask may alter a contrast of the colors associated with the previously rendered multimedia content.

Figure 4:
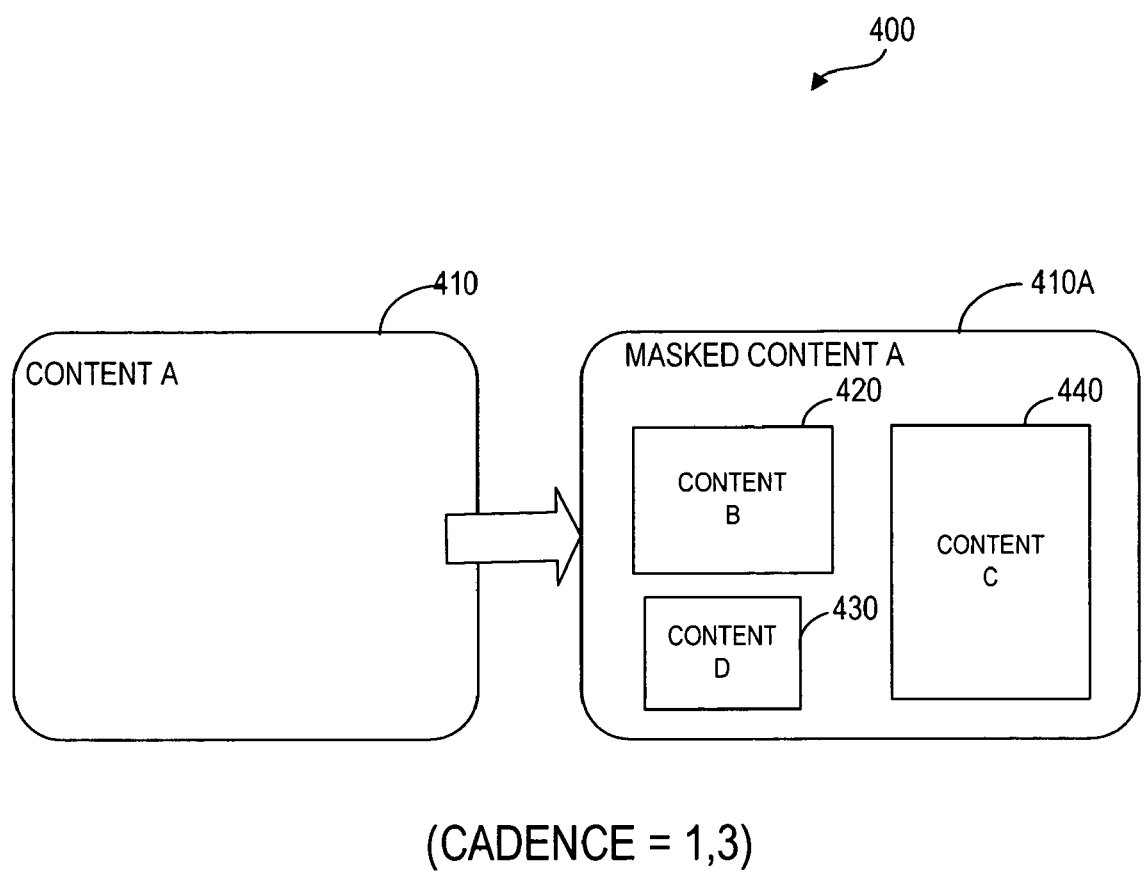
FIG. 4 is a content diagram that illustrates the cadence associated with the layout defining background information, according to embodiments of the invention.

FIG. 4 is a content diagram that illustrates the cadence associated with the layout defining background information, according to embodiments of the invention.

A theme 400 having a one-three cadence may define background information for layouts 410 having one placeholder and 410A having three placeholders. The layout 410 may be associated with no background, while layout 410A is associated with background information related to multimedia content mapped to the placeholder in layout 410. The background information for layout 410A may be a masked version of the multimedia content rendered with layout 410. Accordingly, when the camera transitions from 410 to 410A the background will be a masked version of the multimedia content rendered in layout 410 and the placeholders 420, 430 and 440 are mapped to the remaining multimedia content.

Embodiments of the invention manage the rendering of multimedia content based on characteristics extracted from the multimedia content. Themes having one or more layouts are automatically selected and populated with the multimedia content based on the characteristics. The multimedia content is rendered by transitioning through the layouts associated with the themes via camera movements.

Figure 5:
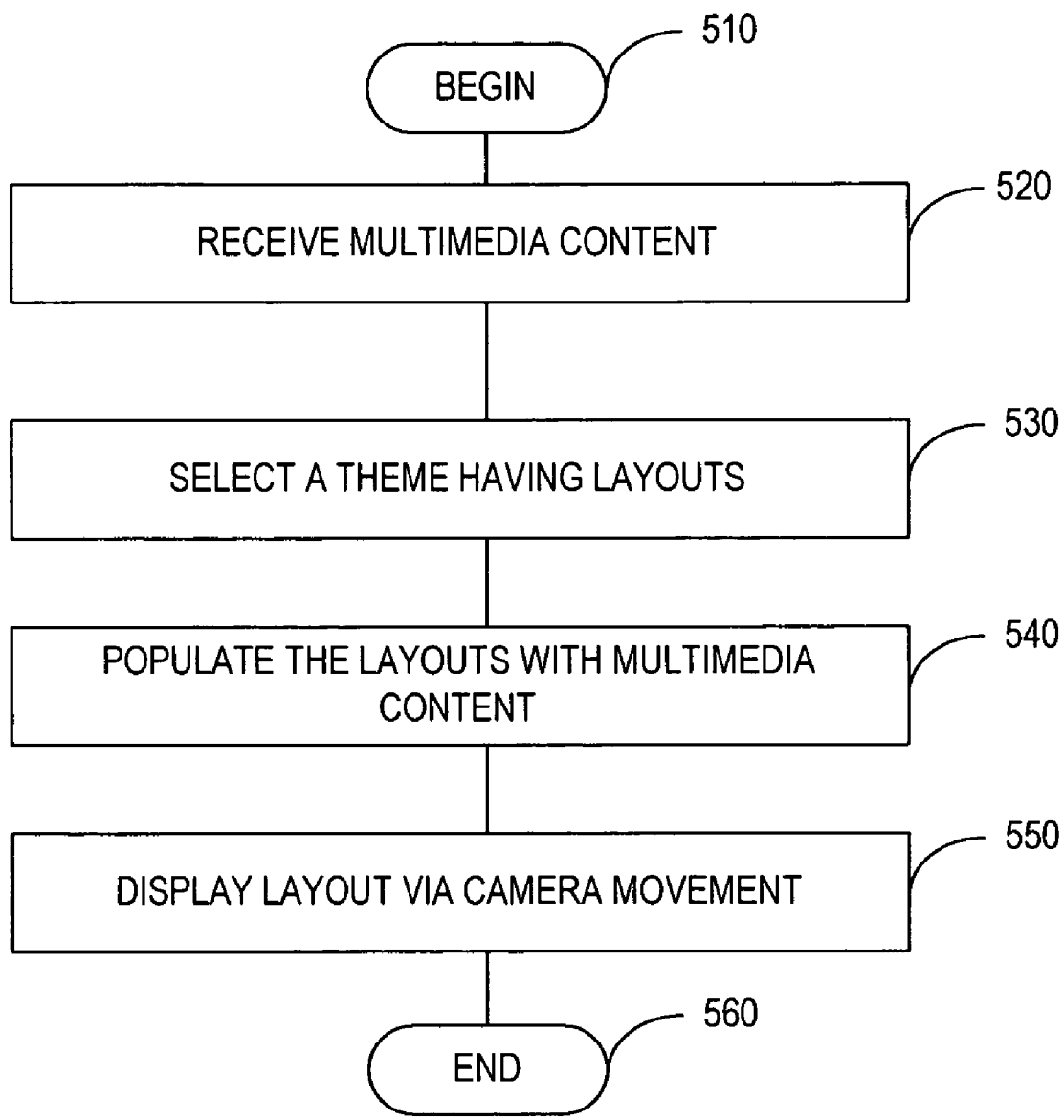
FIG. 5 is a logic diagram that illustrates a computer-implemented method to display multimedia content, according to embodiments of the invention.

FIG. 5 is a logic diagram that illustrates a computer-implemented method to display multimedia content, according to embodiments of the invention.

The method begins in step 510 after a synthesizer is initialized. The synthesizer receives multimedia content in step 520. The synthesizer extracts one or more characteristics from the multimedia content and selects a theme having layouts based on the extracted characteristics in step 530. In turn, the layouts are populated with the multimedia content by a graphics-processing unit in step 540. In step 550, the layouts having the multimedia content are displayed on a display component via transitions associated with camera movements. The method ends in step 560.

For instance, when a synthesizer receives an image and a video file. The synthesizer extracts aspects ratio from the image and video files. Additionally, the video files are further processed to extract timing information corresponding to the length of the video file. The synthesizer generates buffers for the image and video files, and the buffers are mapped to a layout having two placeholders with orientations similar to that of the image and video files. The default time associated with the layout is configured to the length of the video file. The graphics-processing unit (GPU) processes the buffers to render the layout, which simultaneously displays the image and video files. The buffer associated with the video file is updated at specified interval n, where n is a positive number. For instance, when the layout is rendered at t0, the display component displays the image and a snapshot corresponding to the contents of video file at t0. When the layout is rendered at t0+n, the display component displays the image and a snapshot corresponding to the content of the video file at t0+n. The buffer associated with the video file is updated with snapshots of the video file until the default time associated with layout expires.

Optionally, in an embodiment of the invention, displaying the multimedia content may include dynamically altering the layouts associated with the theme. When the layouts are displayed via the camera movements, the layouts are rendered based on a sequence associated with the theme. The sequence may be selected based on one or more characteristics of the multimedia content. In an embodiment, the characteristics include the aspect ratio associated with the multimedia content. In some embodiment, the count associated with the collection of multimedia content may be included in the one or more characteristics. In certain embodiment, the sequence may be dynamically altered based on a count of the multimedia content remaining to be displayed. The dynamic alterations may include, but are not limited to, removing layouts, adding layouts, or replacing a removed layout with a new layout.

Figure 6:
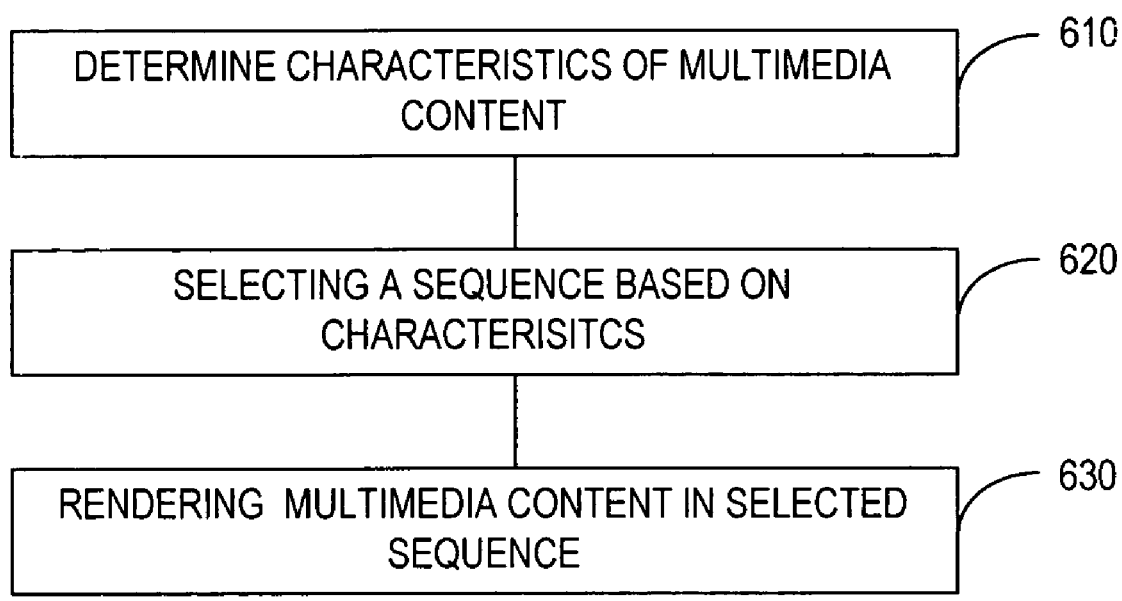
FIG. 6 is a logic diagram that illustrates a computer-implemented method to display the multimedia content in a sequence, according to embodiments of the invention.

FIG. 6 is a logic diagram that illustrates a computer-implemented method to display the multimedia content in a sequence, according to embodiments of the invention. When the collection of multimedia content is provided, the characteristics of the multimedia content are determined in step 610. In step 620, the sequence of the collection layouts may be selected based one or more characteristics of the multimedia content. In some embodiments, selecting the sequence may include altering the layouts include in the sequence based on the one or more characteristics. In step 630, the multimedia content is rendered based on the selected sequence.

In summary, multimedia content is organized and displayed based on characteristics extracted from the multimedia content. Additionally, images and video are rendered simultaneously by one application. Themes provide information utilized to render the multimedia content and may be altered based on a count of the remaining multimedia content.

In an alternate embodiment of the invention, a method to simultaneously render images and videos is provided. The method includes receiving images and videos from a database. The images and videos are processed to determine aspect ratios. In turn, one or more layouts are selected for the images and videos based on the aspect ratios of the images and videos. The selected one or more layout includes one ore placeholders for the images and videos. When the selected one or more layouts are associated with videos, the videos are further processed to determine the length of each video. A default time associated with the selected one or more layouts is altered to a time representing the length of the videos. The selected one or more layouts having the images and videos are rendered by displaying the selected one or more layouts for a time equal to the updated default time, which is long enough for the videos to completely play. When the videos are finished, a subsequent layout is rendered.

The foregoing descriptions of the invention are illustrative, and modifications in configuration and implementation will occur to persons skilled in the art. For instance, while the present invention has generally been described with relation to FIGS. 1-7, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A computer-implemented method to display multimedia content, the method comprising:
   receiving multimedia content comprising video and image content;
   extracting characteristics from the multimedia content;
   selecting a theme having a collection of layouts to organize the multimedia content based on the extracted characteristics, wherein the layouts simultaneously display video and image content;
   populating the layouts with the multimedia content based on characteristics of the multimedia content; and
   displaying the layouts having the multimedia content by way of camera movements and content movements, the layouts include a default display time, and the default display time for layouts having video content is equated to a play duration time associated with the video content and the camera movements to a subsequent layout is initiated when the play duration time is close to expiration.

2. The computer-implemented method according to claim 1, wherein displaying the layouts having the multimedia content by way of camera movements further comprises, presenting the layouts in a sequence associated with the theme.

3. The computer-implemented method according to claim 2, wherein the sequence is selected based on an aspect ratio associated with the multimedia content.

4. The computer-implemented method according to claim 2, wherein the sequence is altered based on a count of multimedia content remaining to be displayed.

5. The computer-implemented method according to claim 1, wherein the sequence is altered based on a count of multimedia content remaining to be displayed.

6. The computer-implemented method according to claim 1, wherein multimedia content is scaled to fit placeholders provided by the layout.

7. The computer-implemented method according to claim 1, wherein placeholders provided by the layout for the multimedia content are scaled to fit the multimedia content.

8. One or more memory devices storing a data structure that provides a graphical layout, the data structure comprising:
   a collection of multimedia content; and
   one or more themes to organize the multimedia content, wherein the themes further comprises,
      a collection of layouts describing placement of the collection of multimedia content, wherein the layout includes placeholders that scale to fit the multimedia content and a default display time used to simultaneously display video and image content,
      a cadence defining transitions between layouts in the collection based on characteristics associated with the multimedia content, wherein the cadence specifies the sequence of transitions between the layouts by camera movements and content movements, and the default display time for layouts having video content is equated to a play duration time associated with the video content and the camera movements to a subsequent layout is initiated when the play duration time is close to expiration.

9. The memory devices according to claim 8, wherein the one or more themes specify default parameters for the collection of layouts.

10. The memory devices according to claim 8, wherein the transitions are camera movements.

11. The memory devices according to claim 8, wherein the placeholders are geometric shapes.

12. The memory devices according to claim 8, wherein the layout is described in a markup language.

13. A computer to manage multimedia content, the computer comprising:
   a collection having multimedia content and layouts;
   a synthesizer to select layouts based on characteristics associated with the multimedia content and to generate buffers for the multimedia content, wherein the synthesizer calculates aspect ratios associated with the multimedia content and selects the layout based on the aspect ratio of the multimedia content,
   a graphics-processing unit to render the multimedia content in the buffers, wherein the graphics-processing unit receives the buffers, populates the selected layout and simultaneously renders the multimedia content associated with video and images on a display component; and
   a display component to display the layouts having the multimedia content by way of camera movements and content movements, the layouts include a default display time, and the default display time for layouts having video content is equated to a play duration time associated with the video content and the camera movements to a subsequent layout is initiated when the play duration time is close to expiration.

14. The computer according to claim 13, wherein the buffers are periodically updated with multimedia content.

15. The computer according to claim 14, wherein the layout includes background content related to previously rendered multimedia content.

16. The computer according to claim 15, wherein the buffers are rendered on the background content.

* * * * *